United States Patent Office 2,824,877
Patented Feb. 25, 1958

2,824,877

BENZYL-PENICILLOATE OF TETRACYCLINE

Lee C. Cheney, Fayetteville, and William J. Gottstein, Syracuse, N. Y., assignors to Bristol Laboratories Inc., Syracuse, N. Y., a corporation of New York No Drawing. Application February 1, 1956
Serial No. 562,630

4 Claims. (Cl. 260—306.7)

The present invention relates to new, non-toxic water-insoluble amine salts, more particularly to penicilloic acid salts of tetracycline, which are capable of exerting a repository antibiotic action and are also useful for oral, therapeutic administration, for external application, for use as a growth-stimulating supplement, as in animal and poultry feeds, drinking water and by implantation, and for use to stimulate the growth of plants, such as radishes, oats and grass, and for use in manufacturing procedures for isolation and purification to enable substantially quantitative removal of tetracycline from solution.

This application is a continuation-in-part of our prior, co-pending application S. N. 396,748, filed December 7, 1953, now abandoned.

The tetracycline D-benzyl-penicilloate of the present invention may be obtained by reaction of penicillin acid with tetracycline in a water-immiscible organic solvent or by the metathetical reaction in water of a water-soluble penicillin salt and a water-soluble salt of tetracycline.

Tetracycline in the form of its free base or an acid addition salt such as the hydrochloride is prepared according to the Journal of the American Chemical Society, volume 75, pages 4621–4623, 1953. D-benzyypenicilloic acid is described on page 574 of The Chemistry of Penicillin: Clark, Johnson and Robinson, Princeton Press, 1949.

A more comprehensive understanding of this invention is obtained by reference to the following examples which are illustrative only and are not the exclusive embodiment of the invention.

*Example I*

Acid penicillin G isopropyletherate (0.492 g.) dissolved in 10 ml. methyl isobutyl ketone was added to a solution of 0.5 g. tetracycline dissolved in 15 ml. methyl isobutyl ketone. Solid tetracycline D-benzylpenicilloate precipitated and was collected by filtration and found to melt over the range 136°–156° C. with decomposition. Found by analysis: C, 57.6 percent; H, 5.78 percent.

The compound was active in the standard penicillin bioassay.

*Example II*

Potassium penicillin G (4.4 g.) was suspended in 50 ml. methyl isobutyl ketone, acidified with dilute phosphoric acid and the organic layer was washed with 50 ml. water, dried over anhydrous sodium sulfate and added to a solution of 5 grams tetracycline in 150 ml. methyl isobutyl ketone. The solution became turbid and was concentrated on a warm water bath (40° C.) in vacuo to one-third its original volume and then cooled. Solid tetracycline D-benzylpenicilloate precipitated and was collected by filtration, slurried with 100 ml. ether containing 1 ml. water, collected by filtration and dried in air. The product was crystalline and soluble in water to the extent of only about 0.16 percent by weight.

*Example III*

Potassium benzylpenicillin (18.6 g., 0.05 mole) in 200 ml. water is mixed under cooling with a saturated solution of tetracycline hydrochloride (25.5 g., 0.05 mole) in water. Tetracycline D-benzylpenicilloate forms and, after the volume has been reduced by distillation in vacuo, is collected by decantation or filtration and dried in vacuo.

*Example IV*

Acid penicillin isopropyletherate (0.492 g.; a commercial mixture of the several penicillins) dissolved in 10 ml. methyl isobutyl ketone is added to a solution of 0.5 g. tetracycline dissolved in 15 ml. methyl isobutyl ketone. Solid tetracycline D-benzylpenicilloate percipitates and is collected by filtration.

*Example V*

Two and four-tenths kg. (5 moles) of tetracycline hydrochloride were dissolved in 21 liters of water. Two-hundred milliliters of concentrated hydrochloric acid were added to adjust the pH to 1.5. This solution was added to 1.965 kg. (5.23 moles) of potassium penicillin G dissolved in 10 liters of water at 0° C. Upon being stirred vigorously for ½ hour, the solution was filtered and the collected salt was washed with 1 liter of cold water and air dried to constant weight; yield 3.432 kg. (88%). M. P. 164–165° C. with decomposition (softens 150–160°). $[\alpha]_D^{23.5} = -54.05°$ (C=1, methyl Cellosolve). Tetracycline potency 728, 770, 700 mcg./mg. by bioassay. No penicillin activity was found either by bioassay or chemical assay. Moisture 2.9%. Anal. calc'd for $C_{22}H_{24}N_2O_8 \cdot C_{16}H_{20}N_2O_5S$ (tetracycline D-benzylpenicilloate) S, 4.02; found: S, 3.77.

*Example VI*

Twenty grams of tetracycline D-benzylpenicilloate was suspended in 150 ml. water at pH 1 in an ice-bath. The mixture was extracted in the cold with five 100 ml. portions of methyl isobutyl ketone. After separation, tetracycline was recovered from the aqueous phase by precipitation after adjusting to pH 4. Yield, 12.2 grams containing 19.1 percent water. The combined methyl isobutyl ketone was extracted in four portions with a solution of 2.05 gm. (0.0512 mole) of sodium hydroxide dissolved in 200 ml. water. The aqueous solutions were combined and lyophilized to give 8.1 g. of sodium D-benzylpenicilloate as a light yellow powder. A portion of this salt in aqueous solution at room temperature gave off carbon dioxide upon acidification.

*Isolation of D-benzylpenicilloic acid.*—A 0.25 gram sample of the disodium salt was dissolved in 5 ml. of water. The solution was cooled in an ice bath with a few particles of ice added directly to the salt solution. Upon acidification with 2 drops of concentrated hydrochloric acid and swirling, a white amorphous solid formed which was filtered off immediately and air dried. M. P. 111–114° C.; $[\alpha]_D^{23.5} = +55.1°$ (C=.2 methanol).

*Regeneration of tetracycline D-benzylpenicilloate.*—One gram of the disodium D-benzylpenicilloate was dissolved in 20 ml. of water. To this solution was added 1.22 grams of tetracycline hydrochloride in 25 ml. of water. Two drops of concentrated hydrochloric acid were added to lower the pH to about 2. The solution was stirred for 15 minutes, filtered, and the salt was dried to constant weight (0.7 gm); M. P. 160–164° decomp.; $[\alpha]_D^{23.5} = -59.12°$ (C=.5 methyl Cellosolve).

The solubility of tetracycline D-benzylpenicilloate in saturated solution in water at 25° C. was measured by bioassay with the following results:

|  | Mgm./ml. |
|---|---|
| pH 2.9 | 2.5 |
| pH 5 | 1.3 |
| pH 6 | 0.97 |
| pH 7 | 1.06 |
| pH 8 | 1.63 |

While the present invention has been described with particular reference to penicillin G it will be understood that other penicillins are also included within the scope of this invention. For instance, penicillins such as the penicillins G, F, X, dihydro F, O, BT, and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the solution in an organic solvent of the free amine may be prepared in the organic solvent by the use of caustic to liberate the free amine from an organic-solvent soluble or water soluble salt such as the hydrochloride, phosphate, nitrate, hydrobromide, sulfate, citrate, acetate and tartrate.

The salts of the present invention, whether alone or in combination with other therapeutic agents, are used as a simple powder, as tablets, as troches, as lozenges, or in capsules. Aqueous suspensions are prepared in advance or in situ when the stability of other added agents (e. g. potassium benzylpenicillin) so requires, and are a highly acceptable oral dosage form. A particularly useful oral dosage form is a suspension in a palatable, acceptable edible oil; coconut oil is preferred, particularly when free of tristearin and gelled with an aluminum stearate (cf. U. S. Patent 2,507,193). The salts of the present invention are admixed with suitable buffers or pharmaceutical additives, preservatives, diluents, binders, lubricants, masticatory substances, colors, flavors, suspending agents, dispersing agents, resuspending agents, and stabilizing agents as desired.

The salts of the present invention, alone or in combination with other therapeutic agents, are presented for parenteral use as a suspension in an injectable oil (e. g. peanut oil), as a suspension in a gelled injectable oil (e. g. peanut oil gelled with 2% aluminum monostearate), as an aqueous suspension or as a powder to which a sterile, aqueous diluent is added before use to generate an injectable suspension. These aqueous suspensions often advantageously contain non-toxic suspending or dispersing agents, such as sodium carboxymethylcellulose, methylcellulose, polyvinyl alcohol, polyvinyl-pyrrolidone, gum tragacanth, gelatin, pectin, alginates, dextrans, gum karaya, lecithin, Spans, Tweens, Amerchols, inositolphosphoric acids and their non-toxic salts (e. g. sodium phytate), glyceryl monostearate, Kreelon CD, polyoxyalkylene-sorbitols, no more than 2.0 percent of an injectable oil such as peanut oil and condensation products, having molecular weights greater than 1500, of ethylene oxide with a condensation product of propylene oxide with propylene glycol (e. g. Pluronic F 68). On occasion, it is advantageous to actually coat the particles of salt, at least in part, with one of these agents, e. g. lecithin.

If desired, buffering agents are added such as sodium citrate or sodium phosphates, as when the salts of this invention are used with an alkali metal salt of penicillin. When appropriate, the suspensions may be buffered by the addition of free acids, e. g. citric acid, phosphoric acid. If desired, a stabilizing agent is added, such as sodium hexametaphosphate, hexamethylenetetramine or sodium phytate. Small amounts of preservative are often used, e. g. phenol, cresol or alkyl esters of p-hydroxybenzoic acid. Useful variations in the properties of the salts of the present invention are obtained by altering particle size or shape, as by varying procedures of crystallization or, most easily, by mechanical means such as grinding, hammer-milling, pulverizing, or micronizing.

When desired for specific purposes, administered by appropriate routes, and rendered pharmaceutically compatible as described in the art for water-insoluble salts of penicillin, there may be admixed with the salts of the present invention, and particularly those prepared for oral use, one or more of various other medicaments such as antihistamines, sulfa drugs (e. g. sulfadiazine, sulfamerazine, sulfamethazine, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'3,4-dimethylbenzoyl-sulfanilamide, benzylsulfanilamide and N'-(2-quinoxalyl)-sulfanilamide), vitamins (e. g. vitamins A, $B_1$, $B_2$, $B_6$, $B_{12}$, and members of that family, folic acid and members of that family, vitamins C, $D_2$, $D_3$, and E), lipotropic agents, stimulants (e. g. caffeine, amphetamines), analgesics (e. g. aspirin, salicylamide, sodium gentisate, p-acetylaminophenol, phenacetin, codeine), laxatives (e. g. phenolphthalein), sedatives (e. g. barbiturates, bromides), salts of penicillin (e. g. potassium penicillin G, procaine penicillin G, 1-ephenamine penicillin G, dibenzylamine penicillin G, other salts disclosed by U. S. Patent 2,627,491; these combinations are particularly useful to enable variation of the pattern of blood levels obtained) other antibiotic agents (e. g. streptomycin, dihydrostreptomycin, neomycin, bacitracin, polymixin, tyrothricin, erythromycin, Aureomycin, Terramycin, tetracycline, chloramphenicol, magnamycin; in some cases such combinations attack a wider range of organisms or show synergistic efficacy or provide decreased toxicity with equal efficacy) and spreading agents (e. g. hyaluronidase).

Multiple combinations of such added agents are often useful, e. g. sulfadiazine and sulfamerazine to provide equal efficacy and reduced toxicity; substantially equal amounts of a non-toxic acid addition salt of streptomycin and a non-toxic acid addition salt of dihydrostreptomycin (sulfate; sulfate iodine) to provide equal efficacy and reduced toxicity; aspirin, phenacetin and caffeine; multiple vitamins; highly water-soluble salts of penicillin (e. g. potassium) with moderately water-insoluble salts of penicillin (e. g. procaine).

Further information which is readily applied to formulations and combinations of the salts of the present invention is to be found in U. S. Patents 2,602,038, 2,608,507, 2,608,509, 2,619,447, 2,515,898, 2,533,066, 2,507,193 and 2,578,651.

We claim:
1. Tetracycline penicilloate.
2. Tetracycline D-benzylpenicilloate.
3. The process of mixing in the cold an aqueous solu- tion of tetracycline below pH 2 with a substantially equivalent quantity of a water-soluble salt of penicillin G to precipitate tetracycline D-benzylpenicilloate.

4. The process of mixing in the cold an aqueous solution of tetracycline below pH 2 with a substantially equivalent quantity of potassium penicillin G to precipitate tetracycline D-benzylpenicilloate.

References Cited in the file of this patent

UNITED STATES PATENTS 2,627,491  Szabo et al. _____ Feb. 3, 1953

FOREIGN PATENTS 505,709  Belgium _____ Sept. 29, 1951

OTHER REFERENCES

Drug Trade News, vol. 26, Jan. 22, 1951, p. 49 (Mfg. section).

"American J. of Pharmacy," July 1945, p. 253.

Price et al.: "Annals of the N. Y. Acad. Sci.," vol. 51, Art. 2, Nov. 30, 1948, p. 216.